(12) United States Patent
Siw et al.

(10) Patent No.: US 11,085,313 B2
(45) Date of Patent: Aug. 10, 2021

(54) SYSTEM AND METHOD FOR TRANSPORTING LUBRICANT THROUGH A VANE

(71) Applicant: Raytheon Technologies Corporation, Farmington, CT (US)

(72) Inventors: Sin Chien Siw, Windsor, CT (US); Timothy Castaldo, West Hartford, CT (US); Charles Joseph Banas, Norwich, CT (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 0 days.

(21) Appl. No.: 16/691,950

(22) Filed: Nov. 22, 2019

(65) Prior Publication Data
US 2021/0156273 A1 May 27, 2021

(51) Int. Cl.
*F01D 9/06* (2006.01)
*F01D 25/12* (2006.01)
(Continued)

(52) U.S. Cl.
CPC ........... *F01D 9/065* (2013.01); *F01D 25/162* (2013.01); *F01D 25/12* (2013.01); *F02C 7/36* (2013.01);
(Continued)

(58) Field of Classification Search
CPC ........ F01D 9/065; F01D 25/12; F01D 25/162; F02C 7/36; F02K 3/06; F05D 2220/323;
(Continued)

(56) References Cited

U.S. PATENT DOCUMENTS 6,438,938 B1 * 8/2002 Burkholder ............. F01D 25/18
60/39.08
8,596,959 B2 * 12/2013 Durocher ................ F01D 9/065
415/110
(Continued)

FOREIGN PATENT DOCUMENTS

EP 3358140 A1 8/2018
EP 3561235 A1 10/2019

OTHER PUBLICATIONS

Partial European Search Report; Application No. 20209062.7-1004I dated Feb. 25, 2021; 13 pages.

*Primary Examiner* — Igor Kershteyn
(74) *Attorney, Agent, or Firm* — Cantor Colburn LLP

(57) ABSTRACT

Disclosed is a mid-turbine frame of a gas turbine engine, including: a vane extending along an axis; a first fitting; a second fitting spaced apart from the first fitting along the axis; a tube assembly located within the vane wherein a cavity is defined between the vane and the tube assembly, the tube assembly including: an outer tube coupled to the first fitting and extending therefrom to the second fitting; an inner tube located within the outer tube and extending from the first fitting to the second fitting; and an outer passage defined between the outer tube and the inner tube, and an inner passage defined within the inner tube, wherein the cavity, the outer passage and the inner passage are fluidly isolated from one another, and the cavity is configured to direct a cooling flow therethrough, and the outer tube is configured to direct a buffer flow therethrough.

20 Claims, 7 Drawing Sheets

(51) Int. Cl.
   *F01D 25/16* (2006.01)
   *F02K 3/06* (2006.01)
   *F02C 7/36* (2006.01)

(52) U.S. Cl.
   CPC .......... *F02K 3/06* (2013.01); *F05D 2220/323* (2013.01); *F05D 2230/60* (2013.01); *F05D 2240/12* (2013.01); *F05D 2240/50* (2013.01); *F05D 2240/55* (2013.01)

(58) Field of Classification Search
   CPC ............. F05D 2230/60; F05D 2240/12; F05D 2240/50; F05D 2240/55
   See application file for complete search history.

(56) References Cited

U.S. PATENT DOCUMENTS

| | | | |
|---|---|---|---|
| 8,944,749 B2 * | 2/2015 | Durocher | F01D 9/065 415/1 |
| 2010/0135786 A1 * | 6/2010 | Manteiga | F01D 25/18 415/232 |
| 2011/0085895 A1 | 4/2011 | Durocher et al. | |
| 2014/0205447 A1 | 7/2014 | Patat et al. | |
| 2015/0219011 A1 | 8/2015 | Muldoon et al. | |
| 2016/0230910 A1 * | 8/2016 | Reuben | F01D 25/16 |
| 2016/0326910 A1 * | 11/2016 | Socha | F01D 25/18 |
| 2017/0292449 A1 * | 10/2017 | Agara | F01D 25/18 |
| 2018/0128122 A1 | 5/2018 | Avis et al. | |
| 2019/0112946 A1 | 4/2019 | Matteson et al. | |
| 2019/0113163 A1 | 4/2019 | Godfrey et al. | |
| 2019/0226404 A1 | 7/2019 | Bellis | |

* cited by examiner

SYSTEM AND METHOD FOR TRANSPORTING LUBRICANT THROUGH A VANE

BACKGROUND

This disclosure relates to gas turbine engines, and more particularly to a system and method for transporting lubricant through a vane of the gas turbine engine.

Gas turbine engines are used in numerous applications, one of which is for providing thrust to an aircraft. Lubricant is transferred through service tubes extending through frame components to reach bearing compartments. The service tubes extend through hollow structures such as struts and vanes to keep the service tubes out of the engine core. Cooling air may be passed through a cavity within the hollow structures in an effort to shield the service tubes from core gas heat. However the cooling air may be warm enough to cause undesirable coking of the lubricant within the service tube.

BRIEF DESCRIPTION

Disclosed is a mid-turbine frame of a gas turbine engine, including: a vane extending from one end to another end along an axis; a first fitting; a second fitting spaced apart from the first fitting along the axis; a tube assembly located within the vane such that a cavity is defined between the vane and the tube assembly, the tube assembly including: an outer tube coupled to the first fitting and extending from the first fitting to the second fitting; an inner tube located within the outer tube and extending from the first fitting to the second fitting; and an outer passage defined between the outer tube and the inner tube, and an inner passage defined within the inner tube, wherein the cavity, the outer passage and the inner passage are fluidly isolated from one another, and the cavity is configured to direct a cooling flow through the cavity, and the outer tube is configured to direct a buffer flow through the outer tube.

In addition to one or more of the above disclosed aspects or as an alternate the inner tube is configured to direct a lubricant flow through the inner tube.

In addition to one or more of the above disclosed aspects or as an alternate the inner tube and the outer tube configured without thermal insulation.

In addition to one or more of the above disclosed aspects or as an alternate, at the second fitting, a plurality of ribs extend between the outer tube and the inner tube and are offset from one another to define a scalloped section with a plurality of openings that are circumferentially spaced apart from one another.

In addition to one or more of the above disclosed aspects or as an alternate, at the first fitting, one end of a tube-end fitting is fluidly connected to a buffer inlet conduit and another end of the tube-end fitting is fluidly connected to the outer tube.

In addition to one or more of the above disclosed aspects or as an alternate the tube-end fitting defines a fitting orifice through which a supply inlet conduit extends to fluidly connect with the inner tube.

In addition to one or more of the above disclosed aspects or as an alternate an air seal is disposed at the fitting orifice to surround the supply inlet conduit at the fitting orifice.

Further disclosed is a gas turbine engine, including: a high-pressure compressor; and a mid-turbine frame, including: a vane extending from one end to another end along an axis; a first fitting; a second fitting spaced apart from the first fitting along the axis; a tube assembly located within the vane such that a cavity is defined between the vane and the tube assembly, the tube assembly including: an outer tube coupled to the first fitting and extending from the first fitting to the second fitting; an inner tube located within the outer tube and extending from the first fitting to the second fitting; and an outer passage defined between the outer tube and the inner tube, and an inner passage defined within the inner tube, wherein the cavity, the outer passage and the inner passage are fluidly isolated from one another, and the cavity is configured to direct a cooling flow through the cavity, the outer tube is configured to direct a buffer flow through the outer tube, and the cooling flow and the buffer flow are bled from the high-pressure compressor.

In addition to one or more of the above disclosed aspects or as an alternate the cooling flow and the buffer flow are both bled from a same stage of the high-pressure compressor.

In addition to one or more of the above disclosed aspects or as an alternate the gas turbine engine includes: a cooling conduit fluidly connected to the high-pressure compressor to supply the cooling flow to the cavity; a buffer conduit fluidly connected to the high-pressure compressor to supply the buffer flow to the outer passage; and a heat exchanger fluidly connected to the buffer conduit between the high-pressure compressor and the mid-turbine frame.

Further disclosed is a method of transporting lubricant through a service tube of a gas turbine engine, including: transporting a cooling flow, at a first pressure and a first temperature, through a cavity defined within a vane of a mid-turbine frame, the cavity defined between an inner wall of the vane and a service tube extending through the vane; transporting a buffer flow, at the first pressure and a second temperature that is lower than the first temperature, through an outer passage in the service tube, the outer passage being defined between an outer tube and an inner tube of the service tube; and transporting a lubricant flow through an inner passage defined within the inner tube of the service tube.

In addition to one or more of the above disclosed aspects or as an alternate the method includes transporting the cooling flow at the pressure and the first temperature from a stage of a high-pressure compressor through a cooling conduit and to the cavity.

In addition to one or more of the above disclosed aspects or as an alternate the method includes transporting the buffer flow from the stage of the high-pressure compressor, through a buffer conduit, and to the outer passage.

In addition to one or more of the above disclosed aspects or as an alternate the method includes transporting the buffer flow through a heat exchanger fluidly coupled to the buffer conduit between the high-pressure compressor and the mid-turbine frame, whereby the buffer flow is at the pressure and the second temperature that is lower than the first temperature.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
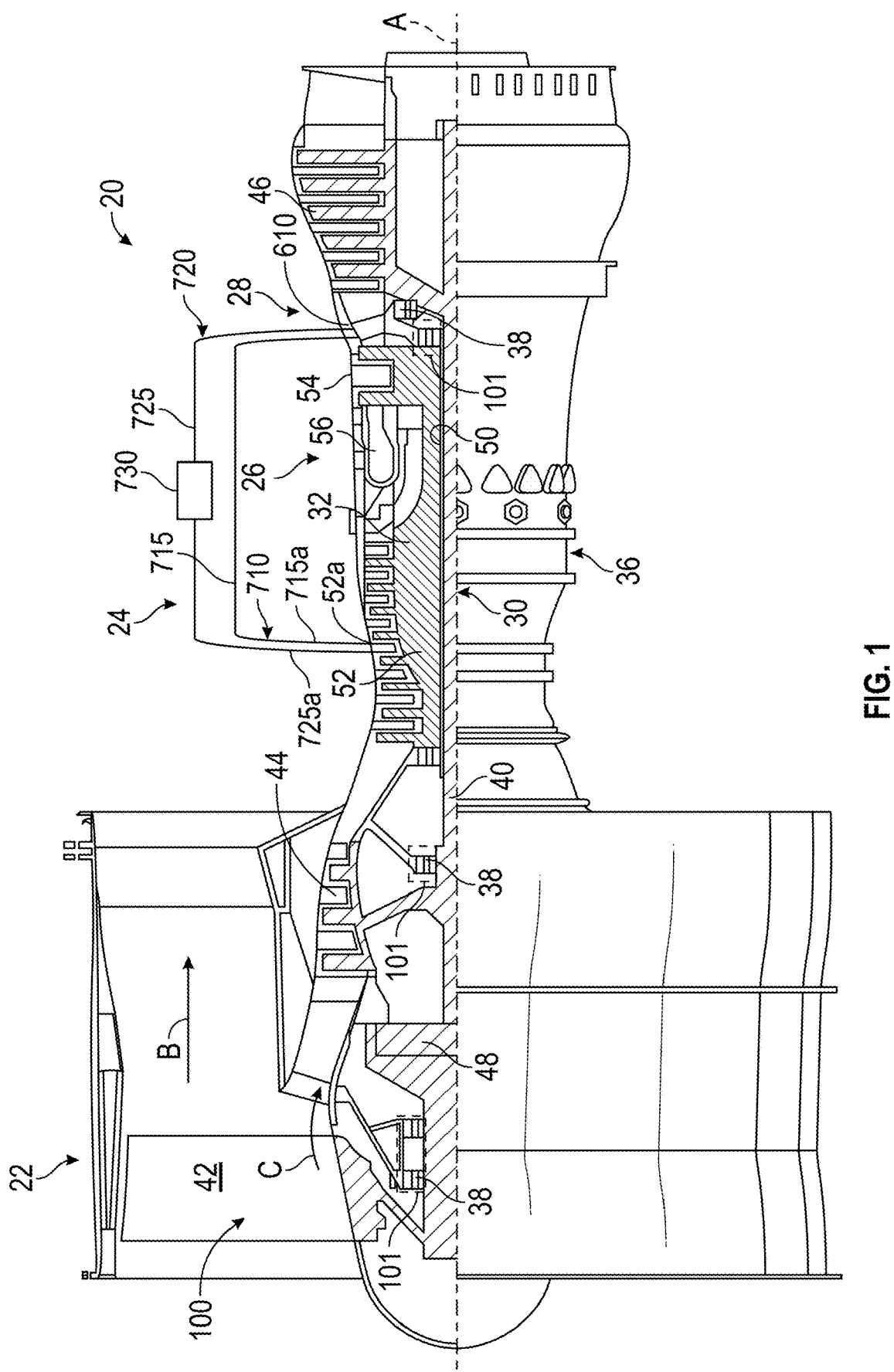
FIG. 1 is cross section of a disclosed gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow-path B in a bypass duct, while the compressor section 24 drives air along a core flow-path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing compartments 38. It should be understood that various bearing compartments 38 at various locations may alternatively or additionally be provided, and the location of bearing compartments 38 may be varied as appropriate to the application.

The low speed spool 30 generally includes an inner shaft 40 that interconnects a fan 42, a low-pressure compressor 44 and a low-pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a high-pressure compressor 52 and high-pressure turbine 54. A combustor 56 is arranged in exemplary gas turbine 20 between the high-pressure compressor 52 and the high-pressure turbine 54. An engine static structure 36 is arranged generally between the high-pressure turbine 54 and the low-pressure turbine 46. The engine static structure 36 further supports bearing compartments 38 in the turbine section 28. The inner shaft 40 and the outer shaft 50 are concentric and rotate via bearing compartments 38 about the engine central longitudinal axis A which is collinear with their longitudinal axes.

The core airflow is compressed by the low-pressure compressor 44 then the high-pressure compressor 52, mixed and burned with fuel in the combustor 56, then expanded over the high-pressure turbine 54 and low-pressure turbine 46. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low-pressure turbine 46 has a pressure ratio that is greater than about five. In one disclosed embodiment, the engine 20 bypass ratio is greater than about ten (10:1), the fan diameter is significantly larger than that of the low-pressure compressor 44, and the low-pressure turbine 46 has a pressure ratio that is greater than about five (5:1). Low-pressure turbine 46 pressure ratio is pressure measured prior to inlet of low-pressure turbine 46 as related to the pressure at the outlet of the low-pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present disclosure is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,688 meters). The flight condition of 0.8 Mach and 35,000 ft (10,688 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of [(Tram ° R)/(518.7° R)]0.5. The "Low corrected fan tip speed" as disclosed herein according to one non-limiting embodiment is less than about 1150 ft/second (350.5 m/sec).

Due to exposure to intense heat in hotter sections of the gas turbine engine, such as in the turbine section 28, and specifically, in the high-pressure turbine 54, oil directed to the damper bearings 55 (FIG. 6) on the high-pressure turbine shaft 56 (FIG. 6; outer shaft 50 identified above), via, e.g., the turbine intermediate case, and through the mid-turbine frame, may heat up and coke. The disclosed embodiments, discussed in greater detail below, provide for transporting oil through the mid-turbine frame such that the oil is prevented from heating to the extent that it cokes.

Figure 2:
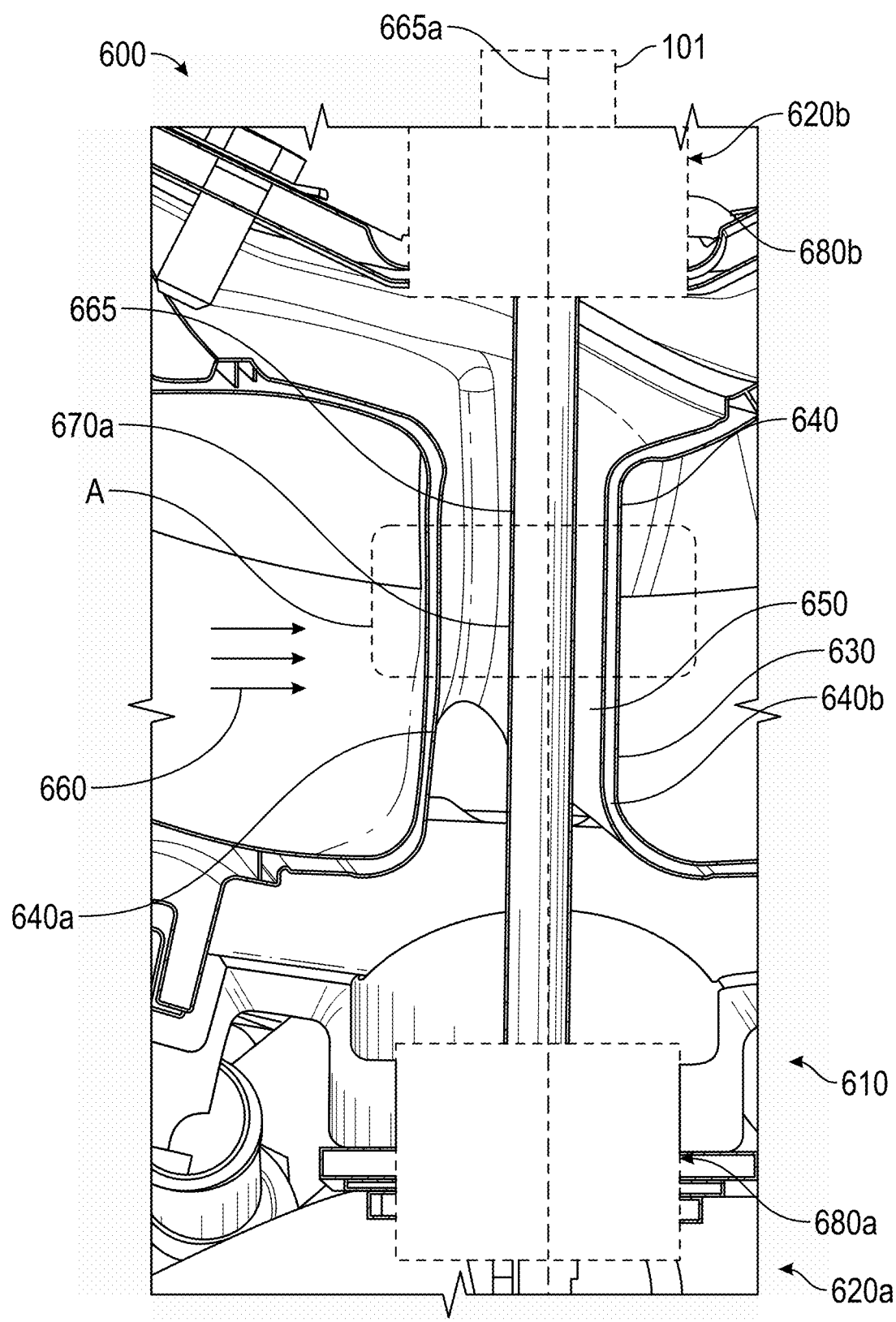
FIG. 2 is cross section of a portion of a mid-turbine frame, showing a cross section of a vane and a service tube extending through the vane.
Figure 3:
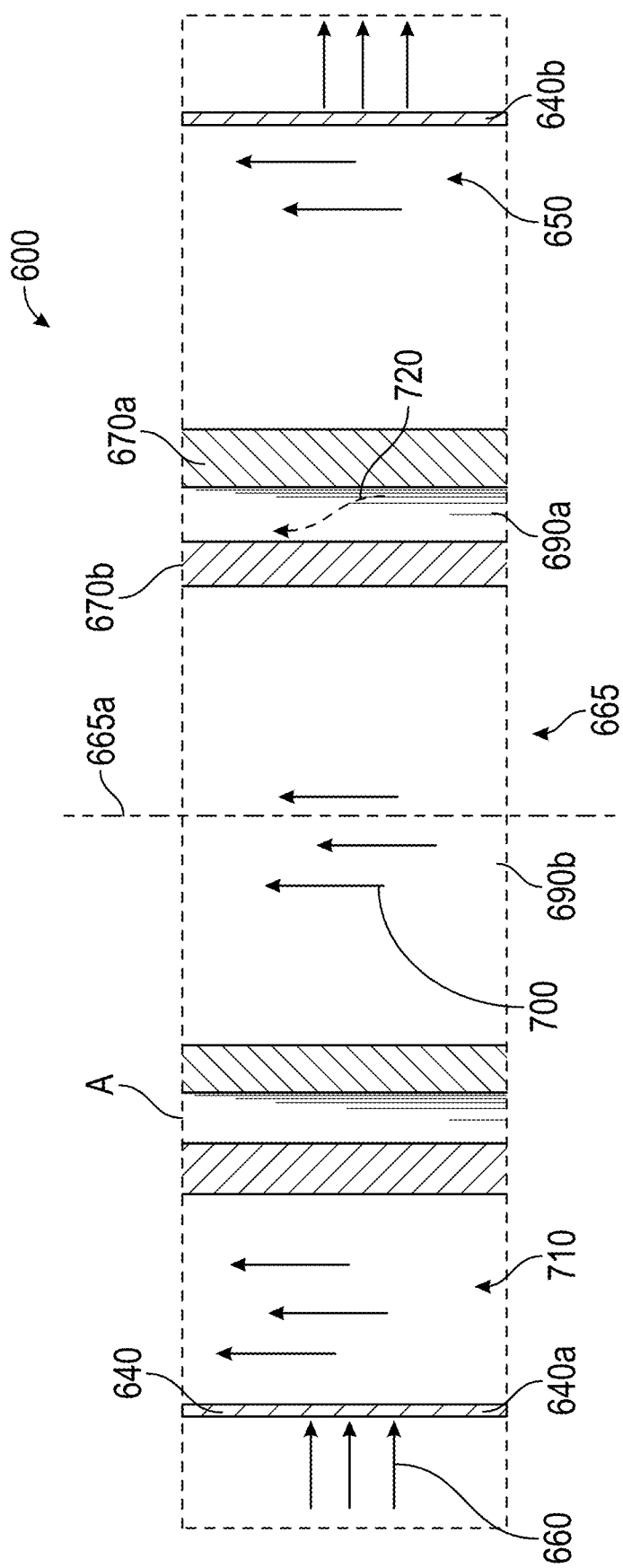
FIG. 3 is a detail of section A of FIG. 2, including a cross section of the service tube.

Turning now to FIGS. 2-3 a thermal management system 600 is provided for a component of the engine 20, where the component is a mid-turbine frame 610 (FIG. 1). The mid-turbine frame 610 shown in FIGS. 2-3 is inverted compared with portion of the mid-turbine frame 610 shown in FIG. 1. The mid-turbine frame 610 includes opposing mid-turbine frame sides 620, including an outer diameter side 620a and an inner diameter side 620b, spaced apart along an axis 665a. As used herein inner diameter side refer to a position that is closer to the axis A of the engine than the outer diameter side. In other words, the inner diameter side is radially closer to the axis A as opposed to the outer diameter side.

A hollow structure (a vane) 630 extends between the opposing mid-turbine frame sides 620. The hollow structure may also be a strut or other structure extending between the opposing mid-turbine frame sides 620. The vane 630 is formed such that it includes a vane inner wall 640 surrounding a vane cavity 650. The vane inner wall 640 extends from a leading end 640a (e.g., a high pressure side) to a trailing end 640b (e.g., a low pressure side) in the core gas path 660 through the mid-turbine frame 610.

A service tube 665 extends along the axis 665a in the vane cavity 650 between the opposing mid-turbine frame sides 620. The service tube 665 is utilized for transporting supply lubricant to, or scavenged lubricant from, a component 101 (illustrated schematically) at the inner diameter side 620b of the mid-turbine frame 610, which component 101 may be a bearing compartment, specifically a bearing damper, or other component. The service tube 665 (tube assembly) is configured as a tube-within-a-tube, e.g., a double wall tube, and includes an outer tube 670a surrounding an inner tube 670b. The service tube 665 extends from a first fitting which is an outer diameter fitting 680a (illustrated schematically) to a second fitting which is an inner diameter fitting 680b (illustrated schematically). The outer diameter fitting 680a is at the outer diameter side 620a of the mid-turbine frame 610 and the inner diameter fitting 680b is at the inner diameter side 620b of the mid-turbine frame 610. An outer passage 690a is defined by a gap between the outer tube 670a and the inner tube 670b. In addition, an inner passage 690b is defined by the inner tube 670b.

To protect the lubricant flow 700 through the inner passage 690b, and rather than utilizing a thermal insulation material, a cooling flow 710, e.g., of air, is transported in the vane cavity 650 outside of the service tube 665. In other words and in one non-limiting embodiment of the present disclosure, no insulation materials are located in the outer passage 690a, between the outer tube 670a and the inner tube 670b, of the service tube 665. The cooling flow 710 is bled, for example, through a cooling conduit 715 (FIG. 1) off of a stage 52a (FIG. 1), which may be the fourth stage, of the high-pressure compressor 52 (FIG. 1). The cooling flow 710 is approximately the same temperature and pressure as the stage 52a of the high-pressure compressor 52 and can reach for example 1200 degrees F. This temperature may cause coking of the lubricant within the inner passage 690b. Therefore, a buffer flow 720, e.g., of air, is transported through the outer passage 690a. The buffer flow 720 is at a lower temperature but at a same pressure as the cooling flow 710. For example, the buffer flow 720 is also bled, e.g., through a buffer conduit 725 (FIG. 1) off of the stage 52a of the high-pressure compressor 52. The buffer flow 720 has been cooled, e.g., by being passed through a heat exchanger 730 (illustrated schematically in FIG. 1) fluidly connected to the buffer conduit 725 before reaching the service tube 665. The temperature of the buffer flow 720 may be, e.g., 80 to 425 degrees F. By providing the cooling flow 710 and the buffer flow 720 at the same pressure, the risk of buckling the outer tube 670a within the vane cavity 650 is reduced. It is to be appreciated that an upstream end 715a of the cooling conduit 715 and an upstream end 725a of the buffer conduit 725 may be separate conduits extending from the stage 52a as shown. Alternatively, the upstream ends 715a, 725a of the cooling conduit 715 and buffer conduit 725 may be split from a single conduit (not shown) extending from the stage 52a to a location between the stage 52a and the heat exchanger 730.

Figure 4:
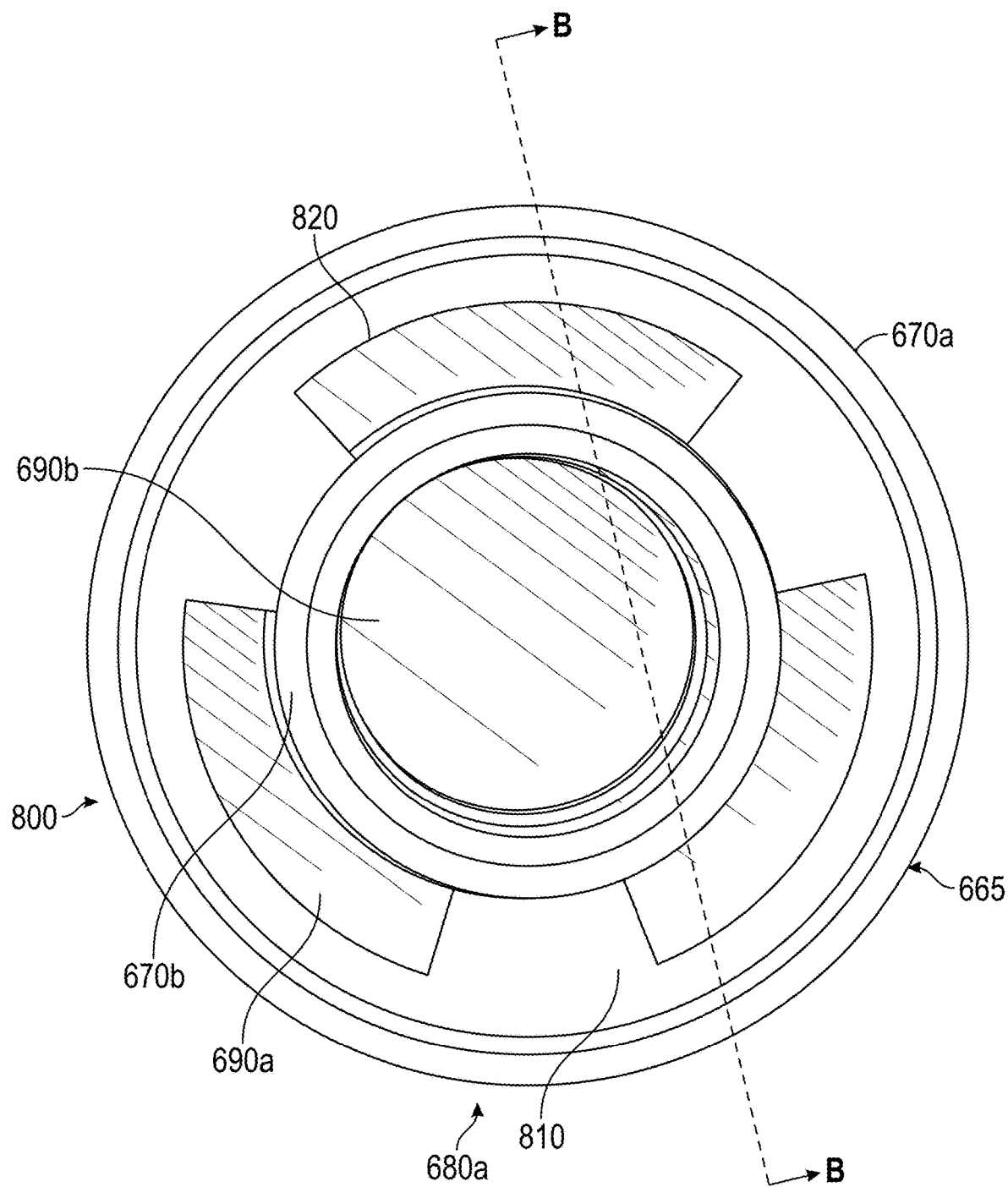
FIG. 4 is a top view of an inner diameter fitting of the service tube.
Figure 5:
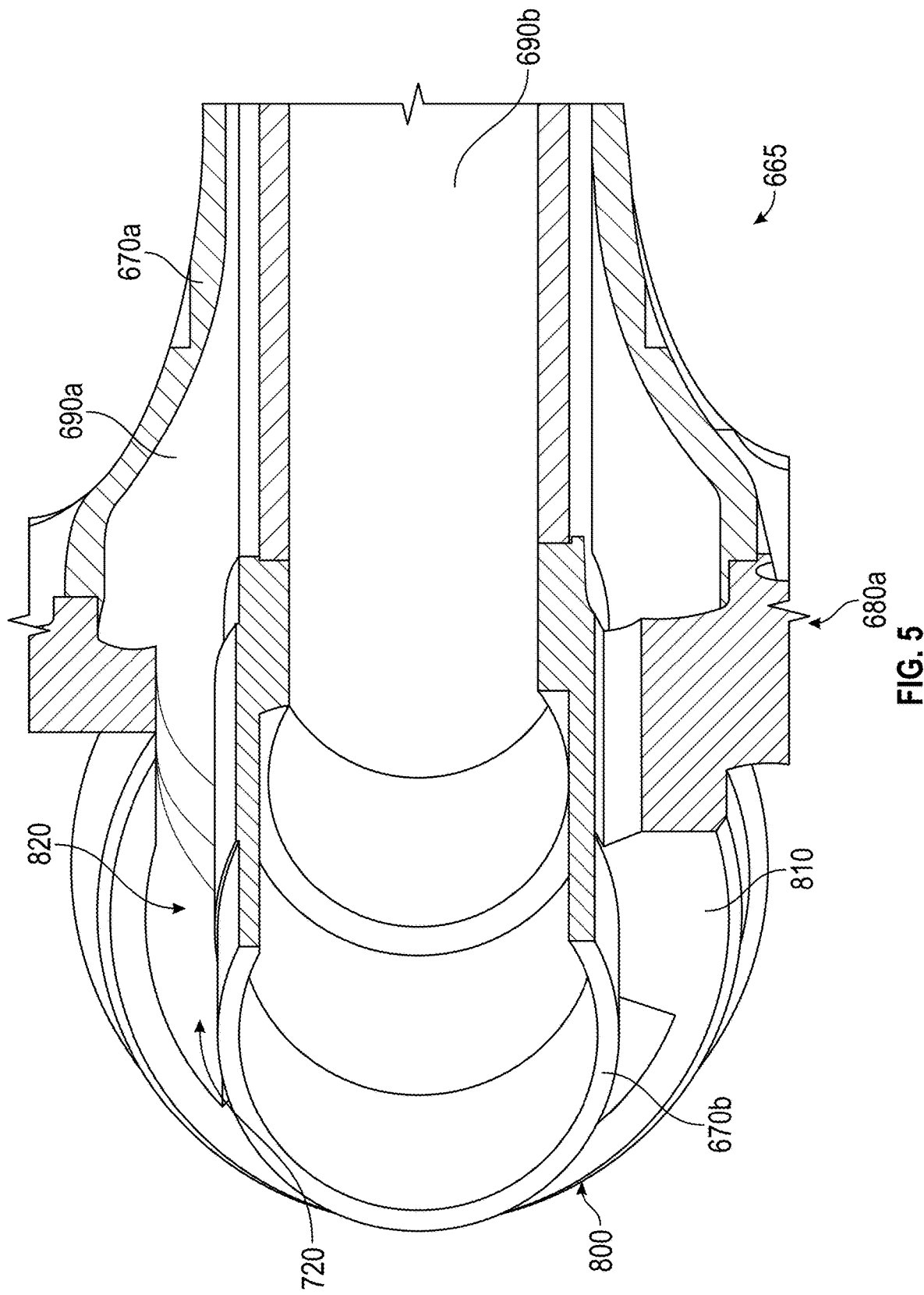
FIG. 5 is cross section of the service tube along lines B-B of FIG. 4.

Turning to FIGS. 4 and 5, additional details are provided for the service tube 665 at the inner diameter fitting 680b. Shown in these figures is the outer tube 670a, the inner tube 670b, the outer passage 690a defined therebetween, and the inner passage 690b defined within the inner tube 670b. The inner diameter fitting 680b may include a scalloped section 800 that may include a plurality of ribs 810 separating a plurality of openings (scallops) 820 defined in the inner diameter fitting 680b and that are circumferentially spaced apart from one another. The plurality of openings 820 direct the buffer flow 720 (FIG. 5) out of the outer passage 690a toward the component 101 (FIG. 2). In addition, the plurality of ribs 810 transfer structural loads from the service tube 665 to surrounding engine structure in the mid-turbine frame 610 (FIG. 2).

Figure 6:
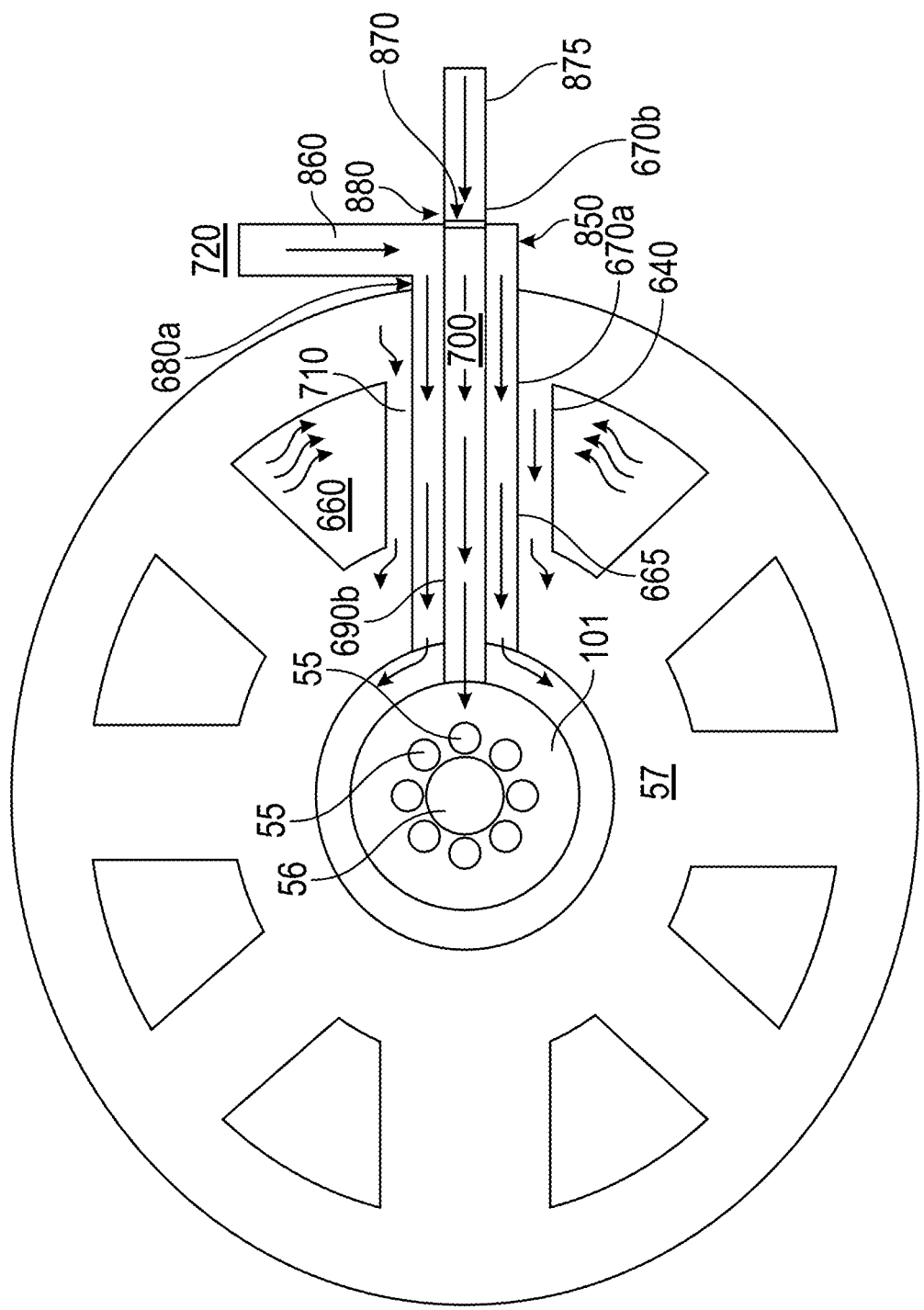
FIG. 6 is an outer diameter fitting of the service tube.

Turning to FIG. 6, additional details are provided for the service tube 665 at the outer diameter fitting 680a. Shown in this figure is the outer tube 670a, the inner tube 670b, the outer passage 690a defined there between, and the inner passage 690b defined within the inner tube 670b. The lubricant flow 700, the cooling flow 710 and the buffer flow 720 are also shown. The buffer flow 720 is directed to the service tube 665, e.g., by a tube-end fitting 850. The tube-end fitting 850 may be an elbow fitting that turns the buffer flow 720, e.g., by ninety degrees from a buffer inlet conduit 860 toward the outer passage 690a. A supply inlet conduit 875 extends through a fitting orifice 870 defined in the tube-end fitting 850 to fluidly connect with the inner tube 670b. An air seal 880 is disposed around the fitting orifice 870 to provide a seal around the inner tube 670b and ensure flow is directed down outer passage 690b, and not leaked into the nacelle cavity.

With the disclosed service tube 665, a lubricant wetted wall of the inner tube 670b is exposed to the buffer flow 720. The buffer flow 720 is substantially lower in temperature than the cooling flow 710 within the vane cavity 650. Thus coking of the lubricant flow 700 may be prevented without utilizing added thermal insulation materials.

Figure 7:
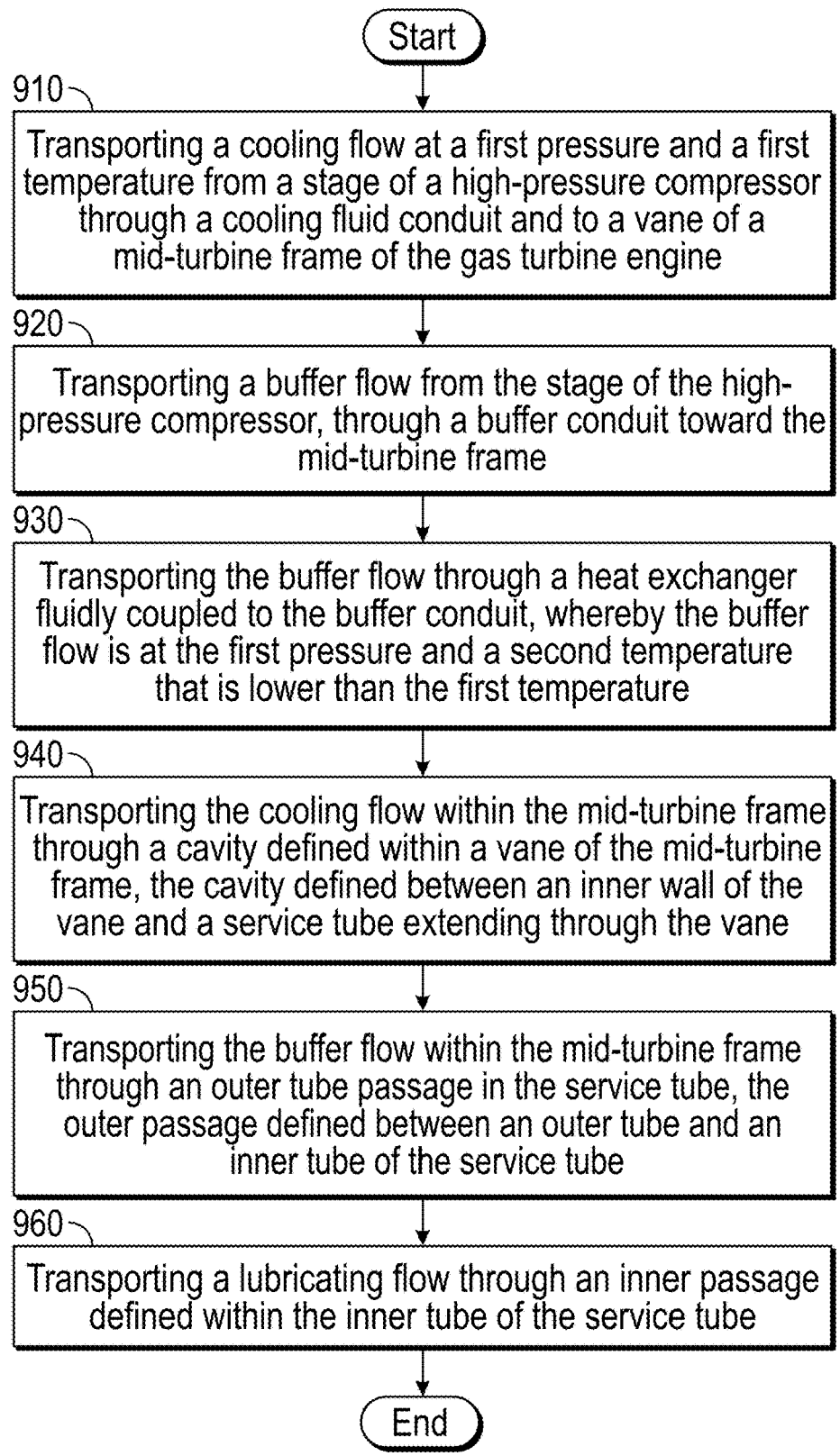
FIG. 7 is a flowchart showing a method of transporting lubricant through the service tube located within the vane.

Turning to FIG. 7, a flowchart shows a method of transporting the lubricant flow 700 through the vane 630 of the mid-turbine frame 610, i.e., of the gas turbine engine 20. As shown in block 910 the method includes transporting the cooling flow 710 at a first pressure and a first temperature from the stage 52a of the high-pressure compressor 52, through the cooling conduit 715 and to the mid-turbine frame 610. As indicated temperatures of air bled from, e.g., the fourth stage, may reach 1200 degrees F.

As shown in block 920 the method includes transporting the buffer flow 720 from the stage 52a of the high-pressure compressor 52, through the buffer conduit 725, toward the mid-turbine frame 610. As shown in block 930 the method includes transporting the buffer flow 720 through a heat exchanger 730 fluidly coupled to the buffer conduit 725. From this configuration the buffer flow 720 is at the first pressure and a second temperature that is lower than the first temperature. For example the second temperature may be between 80 and 425 degrees F.

As shown in block 940 the method includes transporting the cooling flow 710 within the mid-turbine frame 610 through the vane cavity 650 defined within the vane 630 of the mid-turbine frame 610. The vane cavity 650 is defined between the vane inner wall 640 and the service tube 665 extending through the vane 630. As shown in block 950 the method includes transporting the buffer flow 720 within the mid-turbine frame 610 through the outer passage 690a in the service tube 665. The outer passage 690a is defined between the outer tube 670a and the inner tube 670b of the service tube 665. Because the pressure is the same within the vane cavity 650 and the outer passage 690a, the service tube 665 will not buckle based on the utilization of the cooling flow 710 and the buffer flow 720. As shown in block 960 the method includes transporting the lubricant flow 700 through the inner passage 690b in the service tube 665. The inner passage 690b is defined within the inner tube 670b.

The preceding description is exemplary rather than limiting in nature. Variations and modifications to the disclosed examples may become apparent to those skilled in the art that do not necessarily depart from the essence of this invention. The scope of legal protection given to this invention can only be determined by studying the following claims.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A mid-turbine frame of a gas turbine engine, comprising:
    a vane extending from one end to another end along an axis;
    a first fitting;
    a second fitting spaced apart from the first fitting along the axis;
    a tube assembly located within the vane such that a cavity is defined between the vane and the tube assembly, the tube assembly comprising:
        an outer tube coupled to the first fitting and extending from the first fitting to the second fitting;
        an inner tube located within the outer tube and extending from the first fitting to the second fitting; and
        an outer passage defined between the outer tube and the inner tube, and an inner passage defined within the inner tube, wherein the cavity, the outer passage and the inner passage are fluidly isolated from one another, and
    the cavity is configured to direct a cooling flow through the cavity, and the outer tube is configured to direct a buffer flow through the outer tube.

2. The mid-turbine frame of claim 1, wherein the inner tube is configured to direct a lubricant flow through the inner tube.

3. The mid-turbine frame of claim 1, wherein the inner tube and the outer tube configured without thermal insulation.

4. The mid-turbine frame of claim 1, wherein, at the second fitting, a plurality of ribs extend between the outer tube and the inner tube and are offset from one another to define a scalloped section with a plurality of openings that are circumferentially spaced apart from one another.

5. The mid-turbine frame of claim 4, wherein, at the first fitting, one end of a tube-end fitting is fluidly connected to a buffer inlet conduit and another end of the tube-end fitting is fluidly connected to the outer tube.

6. The mid-turbine frame of claim 5, wherein the tube-end fitting defines a fitting orifice through which a supply inlet conduit extends to fluidly connect with the inner tube.

7. The mid-turbine frame of claim 6, wherein an air seal is disposed at the fitting orifice to surround the supply inlet conduit at the fitting orifice.

8. A gas turbine engine, comprising:
    a high-pressure compressor; and
    a mid-turbine frame, comprising:
        a vane extending from one end to another end along an axis;
        a first fitting;
        a second fitting spaced apart from the first fitting along the axis;
        a tube assembly located within the vane such that a cavity is defined between the vane and the tube assembly, the tube assembly comprising:
            an outer tube coupled to the first fitting and extending from the first fitting to the second fitting;
            an inner tube located within the outer tube and extending from the first fitting to the second fitting; and
            an outer passage defined between the outer tube and the inner tube, and an inner passage defined within the inner tube, wherein the cavity, the outer passage and the inner passage are fluidly isolated from one another, and
        the cavity is configured to direct a cooling flow through the cavity, and the outer tube is configured to direct a buffer flow through the outer tube, and the cooling flow and the buffer flow are bled from the high-pressure compressor.

9. The gas turbine engine of claim 8, wherein the cooling flow and the buffer flow are both bled from a same stage of the high-pressure compressor.

10. The gas turbine engine of claim 9, comprising:
    a cooling conduit fluidly connected to the high-pressure compressor to supply the cooling flow to the cavity;
    a buffer conduit fluidly connected to the high-pressure compressor to supply the buffer flow to the outer passage; and
    a heat exchanger fluidly connected to the buffer conduit between the high-pressure compressor and the mid-turbine frame.

11. The gas turbine engine of claim 10, wherein the inner tube is configured to direct a lubricant flow through the inner tube.

12. The gas turbine engine of claim 10, wherein the inner tube and the outer tube configured without thermal insulation.

13. The gas turbine engine of claim 10, wherein, at the second fitting, a plurality of ribs extend between the outer tube and the inner tube and are offset from one another to define a scalloped section with a plurality of openings that are circumferentially spaced apart from one another.

14. The gas turbine engine of claim 13, wherein, at the first fitting, one end of a tube-end fitting is fluidly connected to a buffer inlet conduit and another end of the tube-end fitting is fluidly connected to the outer tube.

15. The gas turbine engine of claim 14, wherein the tube-end fitting defines a fitting orifice through which a supply inlet conduit extends to fluidly connect with the inner tube.

16. The gas turbine engine of claim 15, wherein an air seal is disposed at the fitting orifice to surround the supply inlet conduit at the fitting orifice.

17. A method of transporting lubricant through a service tube of a gas turbine engine, comprising:

transporting a cooling flow, at a first pressure and a first temperature, through a cavity defined within a vane of a mid-turbine frame, the cavity defined between an inner wall of the vane and a service tube extending through the vane;

transporting a buffer flow, at the first pressure and a second temperature that is lower than the first temperature, through an outer passage in the service tube, the outer passage being defined between an outer tube and an inner tube of the service tube; and transporting a lubricant flow through an inner passage defined within the inner tube of the service tube.

18. The method of claim 17, comprising transporting the cooling flow at the pressure and the first temperature from a stage of a high-pressure compressor through a cooling conduit and to the cavity.

19. The method of claim 18, comprising transporting the buffer flow from the stage of the high-pressure compressor, through a buffer conduit, and to the outer passage.

20. The method of claim 19, comprising transporting the buffer flow through a heat exchanger fluidly coupled to the buffer conduit between the high-pressure compressor and the mid-turbine frame, whereby the buffer flow is at the pressure and the second temperature that is lower than the first temperature.

* * * * *